(12) United States Patent
Keener

(10) Patent No.: US 11,004,353 B1
(45) Date of Patent: May 11, 2021

(54) BLASTING CAP SIMULATOR

(71) Applicant: David James Keener, Tulsa, OK (US)

(72) Inventor: David James Keener, Tulsa, OK (US)

( * ) Notice: Subject to any disclaimer, the term of this patent is extended or adjusted under 35 U.S.C. 154(b) by 419 days.

(21) Appl. No.: 16/211,088

(22) Filed: Dec. 5, 2018

Related U.S. Application Data

(63) Continuation-in-part of application No. 16/136,558, filed on Sep. 20, 2018, now abandoned.

(60) Provisional application No. 62/561,441, filed on Sep. 21, 2017.

(51) Int. Cl.
*G09B 9/00* (2006.01)
*F42B 8/00* (2006.01)

(52) U.S. Cl.
CPC ............... *G09B 9/003* (2013.01); *F42B 8/00* (2013.01)

(58) Field of Classification Search
CPC .. G09B 9/00; G09B 9/003; G09B 7/00; F42B 4/00; F42B 4/02; F42B 4/12; F42B 4/18; F42B 4/28
See application file for complete search history.

(56) References Cited

U.S. PATENT DOCUMENTS

| | | | |
|---|---|---|---|
| 7,922,491 B2* | 4/2011 | Jones | ............... F42B 8/28 434/11 |
| 8,479,651 B2* | 7/2013 | Schaeffer | ............... F41A 33/04 102/206 |
| 2016/0223304 A1* | 8/2016 | Vabnick | ............... G09B 5/02 |

* cited by examiner

*Primary Examiner* — Timothy A Musselman
(74) *Attorney, Agent, or Firm* — Chad Hinrichs

(57) ABSTRACT

A blasting cap simulator for use in bomb disposal training. The simulator has a bridge rectifier, a voltage regulator and an RF key fob transmitter. A fuse across the incoming power lines shorts the device and prevents it from activating until the fuse is blown. It then sends an RF signal to an instructor. The transmitter uses the power lines as an antenna to send out the RF signal. The transmitter is protected from the voltage of the power lines by a choke located on each powerline.

14 Claims, 3 Drawing Sheets

BLASTING CAP SIMULATOR

1. PRIORITY CLAIM

The present application claims priority to and is a Continuation-In-Part of U.S. patent application Ser. No. 16/136,558 filed on Sep. 20, 2018 which is a Continuation-In-Part of U.S. Provisional Patent Application 62/561,441 filed Sep. 21, 2017. The present application claim priority to both of these applications which are incorporated herein by reference.

2. FIELD OF THE INVENTION

The present invention relates generally to a blasting cap simulator. More particularly, the present invention relates to blasting cap simulator which can be used in training to provide feedback to an instructor on a trainee's progress.

2. BACKGROUND OF THE INVENTION

Explosive disposal is a dangerous profession. With advances in electronics, learning to disarm and defeat various explosive devices requires great expertise and years of training. There are numerous known electric circuits used to detonate these explosives. They can be activated by time, motion, location, remote control and numerous other triggers.

Explosive disposal technicians spend countless hours training on how to disarm these devices. This training occurs both in the classroom and in simulated real-life situations. It involves analyzing "black boxes" containing trigger circuits. During training the trigger circuit is typically wired to a signal device such as an LED, wire match, buzzer or other device to simulate the blasting cap and explosive. If the technician accidentally triggers the device while trying to disarm it, the signal device will be activated, telling the technician they have failed to disarm the device.

The traditional signal devices have several shortcomings. First, if the training is done in a real-world scenario, the technician will be wearing their bomb disposal protective gear. This protective gear includes a helmet and/or other armored shielding over the technician's head. This shielding restricts the technician's field of vision and ability to hear surrounding noises. If the device is triggered the technician may fail to hear or see the signal device.

Second, if the training is done in a real-world simulation the instructor will be hundreds of feet from the technician. Further the instructor will typically have several technicians each working on their own device. If one of the technicians triggers their device the instructor will only know it has occurred if the technician notices the signal and reports it to the instructor. A technician that is struggling to successfully complete a training course may have an incentive to not report their failed attempt to disarm the device.

What is needed, therefore, is a signal device for explosive disposal training which does not allow the technician receiving the training to cheat by resetting it. Second, the signal device should provide a signal to a remotely located instructor when triggered. Further, the signal should allow the instructor to monitor more than one student.

SUMMARY OF THE INVENTION

The present invention is a blasting cap simulator which can be used in bomb disposal training as a signal device. Thus, the blasting cap simulator is wired to the output of a trigger circuit which the bomb technician works to disarm. The simulator provides a remote signal to an instructor when a trigger circuit has been tripped.

The simulator has a bridge rectifier, a voltage regulator and an RF key fob transmitter. A fuse across the incoming power lines shorts the device and prevents it from activating until the fuse is blown. It then sends an RF signal to an instructor. The transmitter uses the power lines as an antenna to send out the RF signal. The transmitter is protected from the voltage of the power lines by a choke located on each powerline.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION

Figure 1:
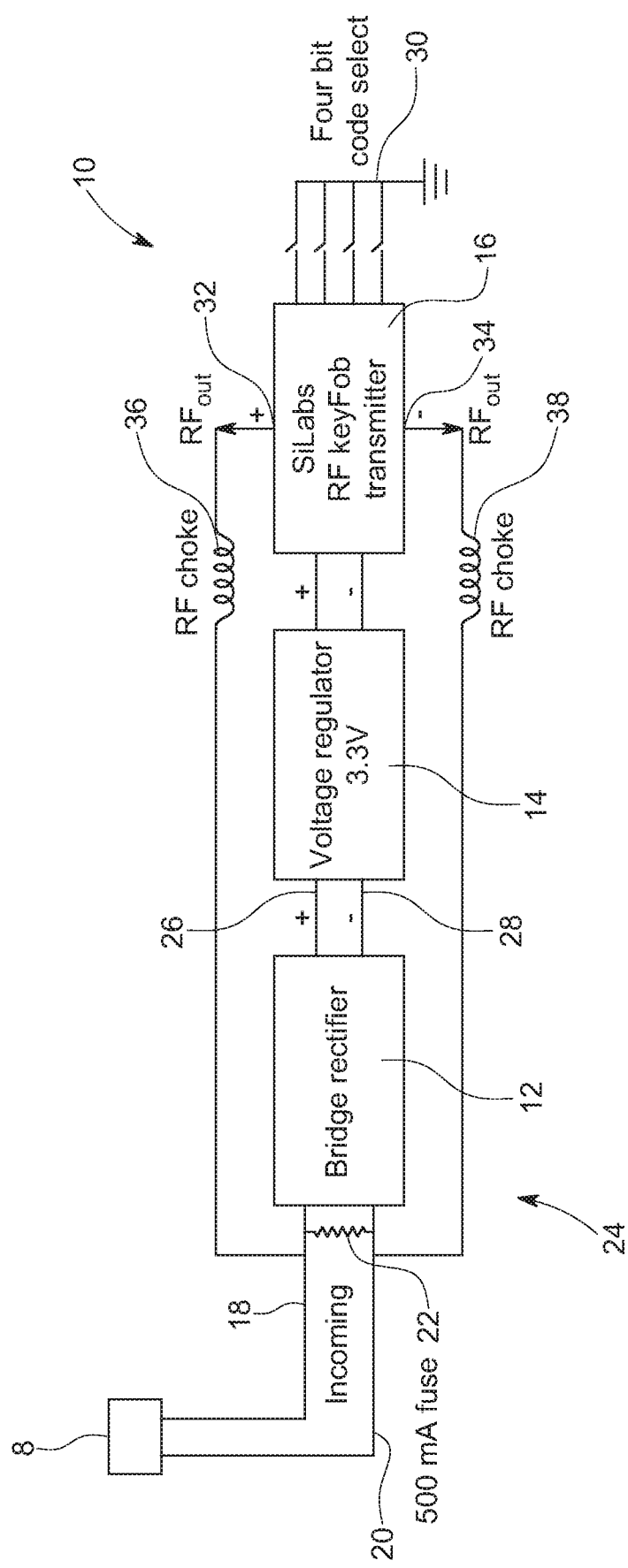
FIG. 1 is a circuit diagram of the preferred embodiment of the blasting cap simulator of the present invention.

The present invention is a blasting cap simulator 10 which can be used in bomb disposal training as a signal device. Thus, the blasting cap simulator 10 is wired to the output of a trigger circuit 8 which the bomb technician works to disarm. If the trigger circuit 8 is tripped a voltage is sent to the blasting cap simulator 10. FIG. 1 provides a circuit diagram of the preferred embodiment of the blasting cap simulator 10 of the present invention. It has bridge rectifier 12, a voltage regulator 14 and an RF key fob transmitter 16. Two incoming wires 18 and 20 provide voltage to the bridge rectifier 12. A fuse bridges 22 between the two wires 18 and 20. In the preferred embodiment it is a 500 mA fuse 22.

As long as the current going through the incoming wires 18 and 20 is below 500 mA, the fuse 22 will short out the circuit 24 and prevent any current from entering the circuit 24 and activating it. If the current exceeds value of the fuse 22, the fuse 22 will blow thus eliminating the short across the incoming wires 18 and 20. This will cause current to enter the bridge rectifier 12.

The bridge rectifier 12 corrects the polarity of the incoming current, so the voltage regulator 14 will receive a positive charge on its positive terminal 26 and negative on its negative terminal 28 regardless of the polarity of the wires 18 and 20 entering the bridge rectifier 12. If the polarity of the voltage entering the voltage regulator 14 is reversed it will not function.

The voltage regulator 14 reduces the voltage of the incoming current to its set amount. In the preferred embodiment this is 3.3 V. This is the voltage needed for the transmitter 16.

When the RF key fob transmitter 16 receives the voltage, it sends out an RF signal. The exact signal can be altered through operation of the four-bit code selectors 30. Thus, more than one simulator 10 can be used when each one has its own distinctive code.

The RF signal is sent out through the RF ports 32 and 34. The ports 32 and 34 are connected to the incoming voltage lines 18 and 20. Thus, the voltage lines 18 and 20 also function as an antenna for the transmitter 26. Each RF Port 32 and 34 is protected from the incoming voltage by a choke 36 and 38.

Figure 2:
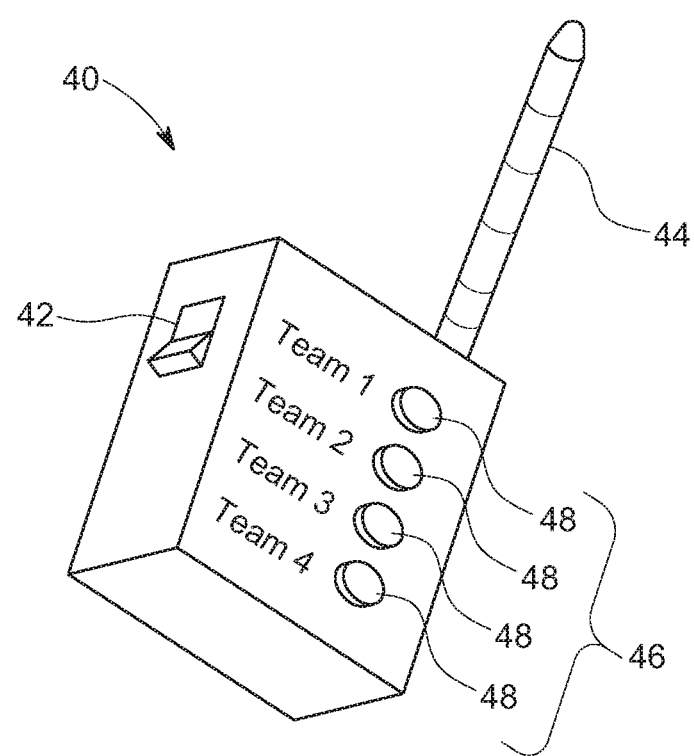
FIG. 2 is a schematic view of the preferred embodiment of the instructor's receiver.

The instructor has an RF receiver 40 to receive the signal from the transmitter 16 on the simulator 10. As seen in FIG. 2, it has a power switch 42, antenna 44 and a display 46 which indicates which of a plurality of simulators 10 has been tripped. Various types of displays 46 may be used. In the preferred embodiment the display 46 is a set of LEDs 48. Each LED 48 indicates a different simulator 10. Other displays 46 such as a digital display could also be used.

In the preferred embodiment the blasting cap simulator 10 is a single use device. Once the fuse 22 has been blown it will continually send out an RF signal, so it must be replaced.

Figure 3:
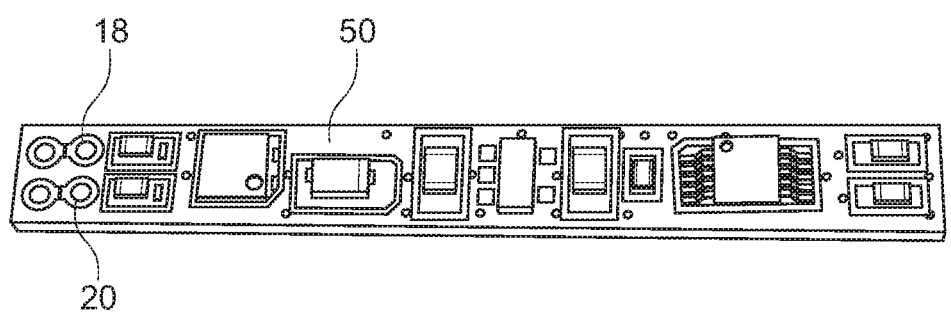
FIG. 3 is a picture of the top of the preferred embodiment of the circuit board used for the present invention.
Figure 4:
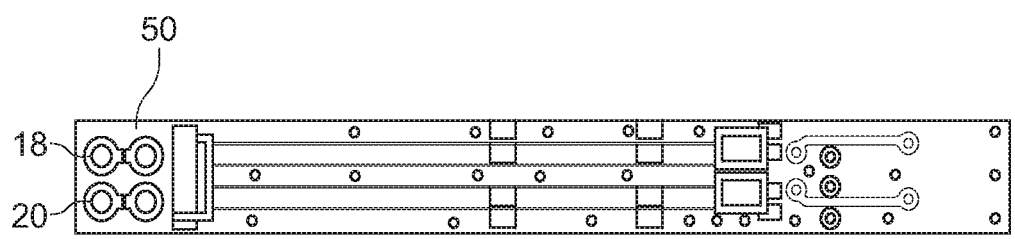
FIG. 4 is a picture of the bottom of the preferred embodiment of the circuit board used for the present invention.

Further, in the preferred embodiment the simulator 10 is constructed on a circuit board 50 which readily fits in a cylinder the size of a typical blasting cap. Thus, it is preferably 5 mm or less wide and 44 mm or less long as shown in FIGS. 3 and 4.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A blasting cap simulator comprising:
a pair of incoming wires providing a voltage to a bridge rectifier;
a voltage regulator with a positive and a negative terminal connected to the bridge rectifier; and
a transmitter connected to the voltage regulator and the transmitter;
wherein the bridge rectifier provides a positive charge to the positive terminal of the voltage regulator and a negative charge to the negative terminal of the voltage regulator, the voltage regulator reduces the voltage of the charges to a predetermined amount and provides the charges to the RF transmitter, the RF transmitter sends out an RF signal through the RF ports.

2. The simulator of claim 1 further comprising:
a pair of RF ports on the transmitter, the RF ports being connected to the pair of incoming wires and each RF port having a choke to protect it from the voltage of the pair of incoming wires;
wherein the pair of incoming wires function as an antenna for the RF signal.

3. The simulator of claim 1 further comprising:
a four-bit code selector capable of altering a signal of the transmitter.

4. The simulator of claim 1 further comprising:
a fuse between the pair of incoming wires;
wherein the fuse provides a short between the pair of incoming wires and prevents the voltage of the pair of incoming wires from reaching the bridge rectifier until the simulator is triggered and the fuse is blown, and if the fuse is blown the pair of incoming wires provides voltage to the bridge rectifier.

5. The simulator of claim 4 further comprising:
a trigger mechanism connected to the pair of incoming wires,
Wherein triggering of the trigger mechanism sends a voltage large enough to the pair of incoming wires to blow the fuse and send power to the bridge rectifier.

6. The simulator of claim 1 further comprising:
an RF receiver capable of receiving the signal from the transmitter.

7. The receiver of claim 6 further comprising:
a display capable of indicating the simulator has been triggered.

8. The receiver of claim 6 further comprising:
a display capable of indicating which one of a plurality of simulators has been triggered.

9. The display of claim 7 comprising a set of LEDs.

10. The display of claim 7 comprising a digital display.

11. The simulator of claim 1 further comprising:
a circuit board holding the bridge rectifier, voltage regulator and transmitter.

12. The simulator of claim 11 further comprising:
the circuit board being 5 mm or less wide and 44 mm or less long.

13. A blasting cap simulator comprising:
a pair of incoming wires providing a voltage to a bridge rectifier;
a voltage regulator with a positive and a negative terminal connected to the bridge rectifier;
a transmitter connected to the voltage regulator and the transmitter having a pair of RF ports, the RF ports being connected to the pair of incoming wires and each RF port having a choke to protect it from the voltage of the pair of incoming wires;
a four-bit code selector capable of altering a signal of the transmitter;
a fuse connecting the pair of incoming wires;
a trigger mechanism connected the pair of incoming wires;
wherein the fuse provides a short between the pair of incoming wires and prevents the voltage of the pair of incoming wires from reaching the bridge rectifier until the fuse is blown, and if the fuse is blown the pair of incoming wires provides voltage to the bridge rectifier and the bridge rectifier provides a positive charge to the positive terminal of the voltage regulator and a negative charge to the negative terminal of the voltage regulator, the voltage regulator reduces the voltage of the charges to a predetermined amount and provides the charges to the RF transmitter, the RF transmitter sends out an RF signal through the RF ports, the pair of incoming wires function as an antenna for the RF signal.

14. The simulator of claim 13 further comprising:
an RF receiver capable of receiving the signal from the transmitter; and
a display located on the RF receiver capable of indicating which one of a plurality of simulators have been activated.

* * * * *